United States Patent [19]

Nagashima et al.

[11] Patent Number: 5,618,626
[45] Date of Patent: Apr. 8, 1997

[54] GLASS PLATE WITH ULTRAVIOLET ABSORBING MULTILAYER COATING

[75] Inventors: Toshikazu Nagashima; Haruki Kuramashi; Yasunobu Iida; Sachio Asai, all of Matsusaka, Japan

[73] Assignee: Central Glass Company, Limited, Ube, Japan

[21] Appl. No.: 574,790

[22] Filed: Dec. 19, 1995

Related U.S. Application Data

[63] Continuation of Ser. No. 144,479, Nov. 2, 1993, abandoned.

[30] Foreign Application Priority Data

Nov. 9, 1992 [JP] Japan .................. 4-298841
Apr. 30, 1993 [JP] Japan .................. 5-104555
Apr. 30, 1993 [JP] Japan .................. 5-104557

[51] Int. Cl.$^6$ ............................ B32B 15/00
[52] U.S. Cl. .................. 428/429; 428/423.1; 428/425.6; 428/425.8; 428/430; 428/432; 428/433; 428/434; 428/441; 428/442; 428/447; 428/451; 428/458; 428/463; 428/469; 428/472; 428/689; 428/690; 428/697; 428/698; 428/699; 428/701; 428/702
[58] Field of Search .................... 428/429, 432, 428/433, 434, 441, 447, 451, 458, 469, 472, 689, 690, 697, 698, 699, 701, 702, 421, 422, 430, 423, 425.6, 442, 463, 425.8

[56] References Cited

U.S. PATENT DOCUMENTS

| | | | |
|---|---|---|---|
| 4,496,611 | 1/1985 | Kawakubo | 428/428 |
| 4,513,061 | 4/1985 | Kawakubo | 428/447 |
| 4,701,017 | 10/1987 | Kookootsedes | 428/429 |
| 4,847,120 | 7/1989 | Gent | 428/451 |
| 4,895,767 | 1/1990 | Mori | 428/429 |
| 4,900,630 | 2/1990 | Suzuki | 428/702 |
| 4,904,525 | 2/1990 | Taniguchi | 428/451 |
| 5,071,993 | 12/1991 | Leppard | 548/220 |
| 5,073,451 | 12/1991 | Iida | 428/702 |
| 5,085,926 | 2/1992 | Iida | 428/702 |
| 5,173,368 | 12/1992 | Belmores | 428/429 |
| 5,223,344 | 6/1993 | Sumpter | 428/451 |

FOREIGN PATENT DOCUMENTS

| | | |
|---|---|---|
| 034722 | 1/1981 | European Pat. Off. . |
| 1503728 | 10/1966 | France . |
| 52-47812 | 4/1952 | Japan . |
| 56-32352 | 4/1981 | Japan . |
| 59-17925 | 2/1984 | Japan . |
| 61-126503 | 6/1986 | Japan . |
| 63-239043 | 10/1988 | Japan . |
| 2-111644 | 4/1990 | Japan . |
| 4-97103 | 3/1992 | Japan . |
| 4-76083 | 3/1992 | Japan . |
| 4-133004 | 5/1992 | Japan . |
| 9201557 | 2/1992 | WIPO . |

OTHER PUBLICATIONS

Soviet Journal of Optical Technoloby, vol. 43, No. 2, Feb. 1976, pp. 103–105. "Protecting Coated Optical Components from the Action of a Human Atmosphere", Z. V. Shivokshina et al.

*Primary Examiner*—Ellis Robinson
*Assistant Examiner*—Timothy M. Speer
*Attorney, Agent, or Firm*—Keck, Mahin & Cate

[57] ABSTRACT

An ultraviolet absorbing multilayer coating formed on one side of a transparent substrate includes a first layer formed on a surface of the transparent substrate and a second layer formed on the first layer. The first layer is an ultraviolet absorbing film of a hardened primer coating of a synthetic resin which is mixed with a fluorescent brightening agent and an ultraviolet absorbing agent. The second layer is a film of a siloxane polymer. An optional infrared reflecting coating is interposed between the transparent substrate and the first layer. The ultraviolet rays until the upper limit of its wavelength can be substantially absorbed by the multilayer coating.

21 Claims, 2 Drawing Sheets

GLASS PLATE WITH ULTRAVIOLET ABSORBING MULTILAYER COATING

This is a continuation application of Ser. No. 08/144,479, filed on Nov. 2, 1993, now abandoned.

BACKGROUND OF THE INVENTION

1. Field of the Invention

The present invention relates to an ultraviolet absorbing glass plate for use in buildings, vehicles, ships, airplanes and various display devices, and more particularly to a glass plate having an ultraviolet absorbing multilayer coating formed thereon.

2. Description of the Prior Art

Hitherto, various ultraviolet absorbing glasses have been proposed. For example, there is proposed a glass which is coated with an ZnO film for cutting ultraviolet rays.

JP-A-52-47812 discloses an ultraviolet absorbing colorless soda-lime glass which contains 0.15–1.2% $CeO_2$, 0.002–0.12% $V_2O_5$, 0.006–0.08% $MnO_2$ or 0.004–0.04% Se, and not higher than 0.0004% $Co_3O_4$ for providing the glass with the ultraviolet absorbing property.

JP-A-59-17925 discloses an agricultural deposition film comprising a plastic film and a synthetic resin film which contains an ultraviolet absorbing agent and is adhered to the plastic film.

The above-mentioned proposals (JP-A-52-47812 and JP-A-59-17925) are not suitable for a production method in which many types of products with small amounts are produced. Furthermore, the glass of JP '812 and the film of JP '925 tend to be colored or clouded if they are constructed so as to absorb ultraviolet rays having a wavelength of about 400 nm (the upper limit of the ultraviolet region).

JP-A-56-32352 discloses a heat reflecting laminated glass in which at least one of two polyvinyl butyral interlayer films contains an ultraviolet absorbing agent. This glass is improved in chemical resistance, abrasion resistance and durability, and does not tend to be colored or clouded because the ultraviolet absorbing agent is contained in the interlayer film. However, the glass tends to be too thick in thickness, and thus to be too heavy.

JP-A-4-76083 discloses an ultraviolet insulating film which comprises cerium oxide and a metal oxide of which metal has a valence larger than that of cerium.

JP-A-4-97103 discloses a method of producing an ultraviolet cutting filter. In this method, at first, water is added to a mixed solution containing an organic titanium compound, a cerium compound and a polyhydric alcohol so as to make a sol. Then, the sol is applied to a transparent substrate, and then the coated substrate is heated.

The above-mentioned proposals (JP-A-4-76083 and JP-A-4-97103) use inorganic compounds basically. Therefore, ultraviolet region which is closer to visible light region can not be sharply cut. Furthermore, it is necessary to bake at a temperature not lower than about 200° C. Therefore, the proposals can not be applied to some glasses such as tempered glass.

JP-A-61-126503 discloses a method of producing an ultraviolet cutting synthetic resin plate by using a dispersion type fluorescent dye having a brightening effect such as 2,5 bis (5'-tertiary butyl benzo oxazolyl(2)) thiophene. This resin plate cuts ultraviolet rays and is superior in transparency without using an ultraviolet absorbing agent. However, fluorescence becomes too marked, and the resin plate is not good in durability.

Apart from the above-mentioned ultraviolet absorbing glass, there are some proposals of an infrared reflecting glass. For example, JP-A-63-239043 discloses an infrared reflecting glass which is coated with a five-layer coating comprising a first layer of ZnO film, a second layer of Ag film, a third layer of ZnO film, a fourth layer of Ag film and a fifth layer of ZnO film. The coated glass is not lower than 60% in the visible light transmittance.

JP-A-2-111644 discloses a laminated glass comprising first and second transparent glass plates and a conductive film formed on the first glass plate by the sputtering and an interlayer film which are interposed between the first and second glass plates. The conductive film is made up of five-layer, seven-layer or nine-layer film which is formed by alternately arranging ITO films as odd-numbered layers and Ag films as even-numbered layers.

The above-mentioned proposals (JP-A-63-239043 and JP-A-2-1116444) use a basic composition of a Ag film sandwiched between dielectric films. However, a Ag film deteriorates by water and a high humidity, thereby impairing infrared reflecting property. Therefore, it is necessary to interpose the infrared reflecting film between two glass plates.

Furthermore, there are some proposed ways to provide a glass with the infrared reflecting property together with the ultraviolet absorbing property. One example is a glass which contains ultraviolet absorbing compounds and coated with an infrared reflecting film. Another example is a laminated glass comprising transparent glass plates which are coated with an infrared reflecting film and interposes therebetween an interlayer film containing ultraviolet absorbing compounds. As still another example, JP-A-4-133004 discloses an ultraviolet and infrared cutting filter formed on a transparent substrate. The filter comprises a ZnO film formed on one side of the transparent substrate and a multilayer coating which is formed on the ZnO film and/or the other side of the transparent substrate. The multilayer coating is formed by alternately depositing transparent conductive oxidized films and transparent dielectric films having a high refractive index. The construction of the filter is very complicated for providing the ZnO film with humidity resistance and protection. Therefore, the production cost of the filter is high and durability of the same is not satisfactory.

SUMMARY OF THE INVENTION

It is an object of the present invention to provide a glass plate having an ultraviolet absorbing multilayer coating formed thereon, which is colorless and transparent, substantially cuts ultraviolet rays throughout its wavelength region until its upper limit (about 400 nm), and is superior in chemical resistance, abrasion resistance and durability.

It is another object of the present invention to provide a glass plate having an infrared reflecting coating and an ultraviolet absorbing multilayer coating, which is colorless and transparent, substantially cuts infrared rays, substantially cuts ultraviolet rays throughout its wavelength region until its upper limit (about 400 nm), and is superior in chemical resistance, abrasion resistance and durability.

According to a first aspect of the present invention, there is provided an ultraviolet absorbing multilayer coating formed on one side of a transparent substrate, said multilayer coating comprising:

a first layer formed on a surface of the transparent substrate, said first layer being an ultraviolet absorbing film of a hardened primer coating of a synthetic resin which is mixed with a fluorescent brightening agent and an ultraviolet absorbing agent; and a second layer formed on said first layer, said second layer being a film of a siloxane polymer.

According to a second aspect of the present invention, there is provided a multilayer coating formed on one side of a transparent substrate, said multilayer coating comprising:

an infrared reflecting coating formed on a surface of the transparent substrate, said infrared reflecting coating comprising at least one layer of one selected from the group consisting of Ag, Au, Cu, Pt and an alloy of at least one of Ag, Au, Cu and Pt;

a first layer formed on said infrared reflecting coating, said first layer being an ultraviolet absorbing film of a hardened primer coating of a synthetic resin which is mixed with a fluorescent brightening agent and an ultraviolet absorbing agent; and a second layer formed on said first layer, said second layer being a film of a siloxane polymer.

According to a third aspect of the present invention, there is provided a multilayer coating formed on one side of a transparent substrate, said multilayer coating comprising:

an infrared reflecting coating formed on a surface of the transparent substrate, said infrared reflecting coating comprising at least one layer of at least one selected from the group consisting of a metal, an oxide, a nitride, a carbide and an oxynitride;

a first layer formed on said infrared reflecting coating, said first layer being an ultraviolet absorbing film of a hardened primer coating of a synthetic resin which is mixed with a fluorescent brightening agent and an ultraviolet absorbing agent; and a second layer formed on said first layer, said second layer being a film of a siloxane polymer.

DESCRIPTION OF THE PREFERRED EMBODIMENTS

Figure 1:
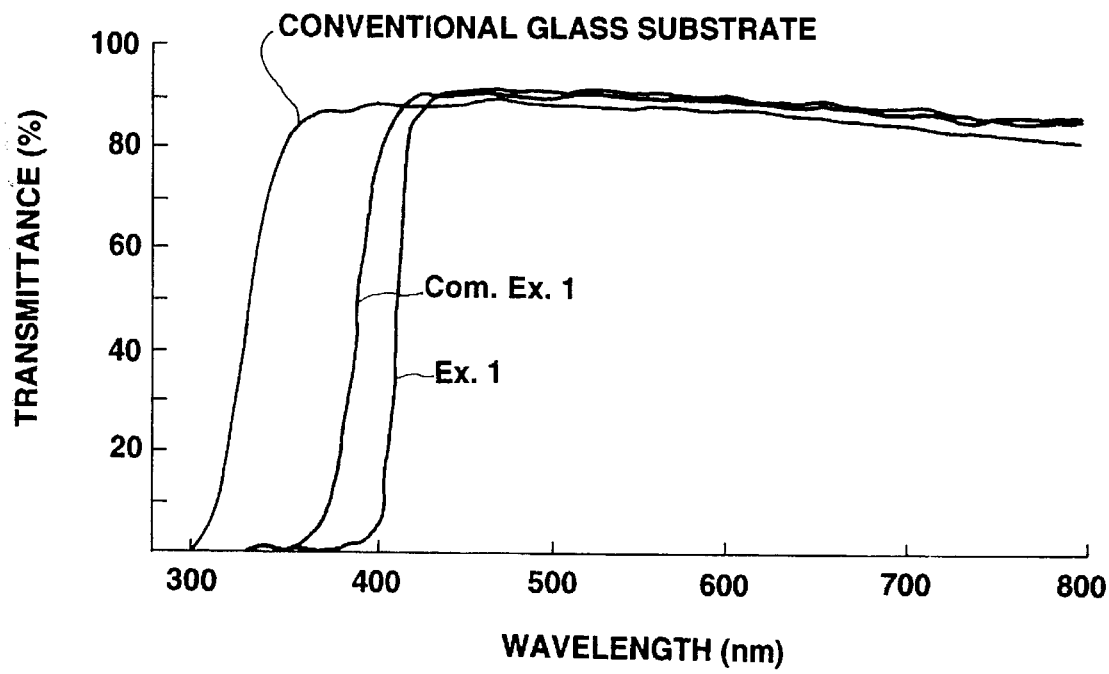
FIG. 1 is a graph showing a relationship between wavelength and transmittance with respect to coated glass plates according to Example 1 and Comparative Example 1 and to a conventional glass substrate.
Figure 2:
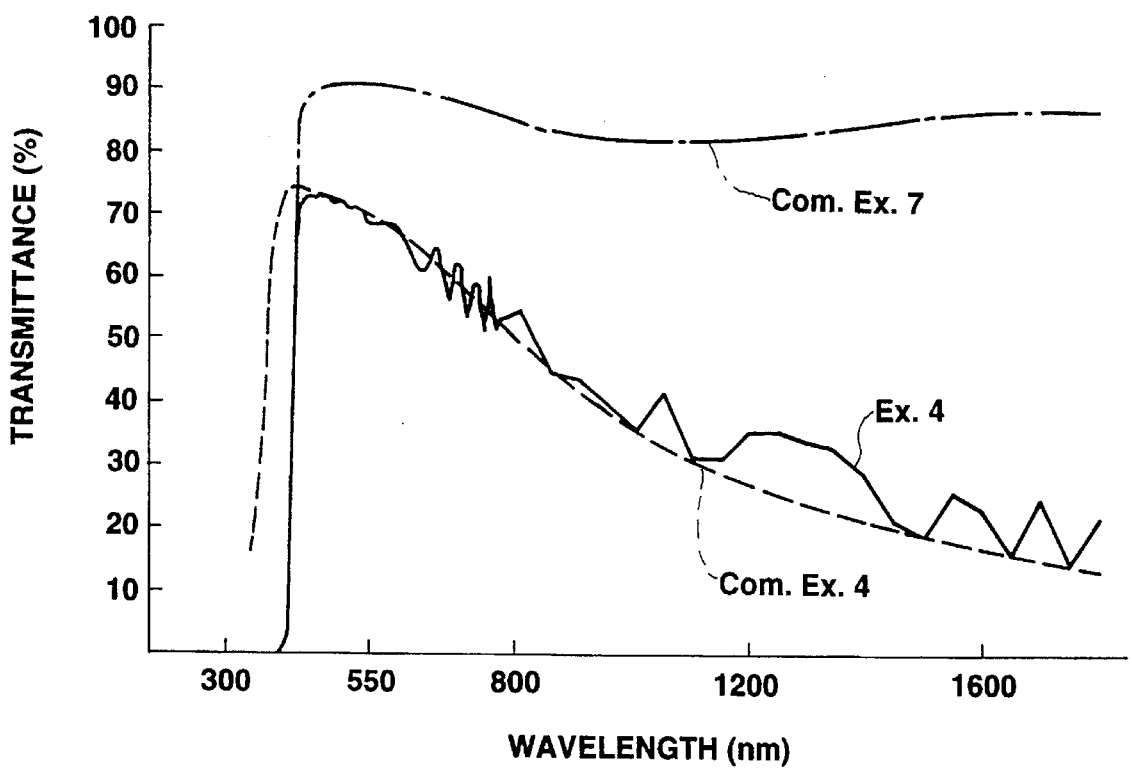
FIG. 2 is a view similar to FIG. 1, but with respect to coated glass plates according to Example 4, and Comparative Examples 4 and 7.

A transparent glass plate having an ultraviolet absorbing multilayer coating formed thereon according to the present invention will be described in the following.

The multilayer coating comprises an ultraviolet absorbing film formed directly on one surface of the transparent glass plate and a protective film formed on the ultraviolet absorbing film.

The ultraviolet absorbing film is formed by applying a synthetic resin primer coating solution on one surface of the transparent glass plate, and then by curing the synthetic resin through drying and heating of the solution.

The protective film is formed by applying a silicone (siloxane resin) based hard coating solution on the hardened ultraviolet absorbing film, and then by curing the siloxane resin coating solution through drying and heating of the solution. In fact, a siloxane prepolymer of the solution is turned into a siloxane polymer through drying and heating of the solution.

A fluorescent brightening agent and an ultraviolet absorbing agent are dissolved in the synthetic resin primer coating solution. The fluorescent brightening agent is not limited to a specific type as long as it has absorption in the ultraviolet region, emits fluorescence in the visible light region, can be dissolved in a synthetic resin (particularly acrylic) primer coating solution, and is not modified by heating at a relatively low temperature. Examples of the fluorescent brightening agents are "UVITEX-OB" (trade name) which is 2,5 bis (5'-tertiary butyl benzo oxazolyl(2)) thiophene and made by Ciba-Geigy Co., and "EB-501" which is a coumarin derivative made by Mitsui Toatsu Senryo Co. These examples have an adequate heat resistance and an absorption wavelength in the boundary region (about 400 nm) between the ultraviolet region and the visible light region. Examples of the ultraviolet absorbing agents are benzophenone, benzotriazole, cyanoacrylate and salicylate. The molar ratio of the fluorescent brightening agent to the ultraviolet absorbing agent is from 1:10 to 1:0.5, and more preferably from 1:5 to 1:1. If the amount of the fluorescent brightening agent is too large, transparency is impaired by fluorescence. If it is too small, a satisfactory ultraviolet absorption is not obtained. Fluorescence emitted from the fluorescent brightening agent is diminished by the ultraviolet absorbing agent.

In the preparation of the synthetic resin (particularly acrylic) primer coating solution, a mixed solvent of ether alcohol solvent such as ethyl cellosolve, and ketone alcohol solvent such as diacetone alcohol, ketone solvent, ether solvent or aromatic compound solvent is preferably used. In particular, in case that the glass plate is an inorganic glass plate, it is preferable to use ketone solvent such as cyclohexanone.

Examples of the synthetic resins are acrylic resin, urethane resin, fluororesin and polyester resin. For example, as acrylic resin, Acrylic "BR" Resin (trade name) made by Mitsubishi Rayon Co. can be used. It is preferable that the concentration of the synthetic resin in the primer coating solution is from about 1 to about 15 wt %, that the total concentration of the fluorescent brightening agent and the ultraviolet absorbing agent in the same is from about 0.5 to about 3 wt %, that viscosity of the primer coating solution is from about 10 to about 1000 cP, and that the thickness of the film of the primer coating solution is from about 1 to about 10 μm.

If the glass plate is an inorganic glass plate, it is preferable to add a kind of adhesion improver such as "OS808A" (trade name) which is silicone-modified acrylic resin solution made by Daihachi Chemical Co. to the primer coating solution in the amount of about 5% to about 20% of the total solution for the purpose of improving adherence of the film of the primer coating solution to the substrate. If its amount is too small, the effect becomes insufficient. If its amount is too large, it becomes uneconomic.

The primer coating solution is applied to the glass plate by, for example, dip coating, spray coating, flow coating or printing so as to form a film on the glass plate. Then, the coated glass plate is heated at a temperature not lower than about 80° C. for about 1 hr so as to harden the film. If this heating is insufficient, the primer coating component tends to be released into the protective film, thereby causing cloud or crack. If the heating is too much, the adherence of the protective film tends to be impaired.

The silicone hard coating solution is preferably basically an alcohol solution of siloxane prepolymer which is obtained by hydrolyzing organoalkoxysilane. It is more preferable to add colloidal silica to the hard coating solution so as to improve abrasion resistance. Examples of commercial products of the silicone hard coating solution are "TOSGUARD 510" made by Toshiba Silicone Co. and "Si COAT 2" made by Daihachi Chemical Co. It is preferable that the silicone hard coating solution has a resin fraction in the amount ranging from about 10 to about 40%, and has a viscosity ranging from about 10 to about 1000 cP. It is preferable that the hard coating solution is applied to a surface of the primer coating film at a temperature ranging from about 15° to about 25° C. at a relative humidity ranging from about 40 to about 50% with a degree of cleanness not larger than about 10,000. The hard coating solution is applied by, for example, dip coating, spray coating, flow coating or printing so as to form the protective film. The thickness of the protective film is preferably from about 2 to about 5 μm. If it is too thin in thickness, the effect of protection by the protective film becomes insufficient. If it is too thick in thickness, the protective film may have cracks during heating. The glass plate coated with the protective film is heated at a temperature not lower than about 80° C. so as to harden the protective film. If the glass plate is an inorganic glass plate, it is preferable that the heating temperature is about 150° C. and that the heating time is about 2 hr. With this, hardness of the protective film becomes sufficient. Due to the provision of the protective film, the ultraviolet absorbing multilayer according to the present invention becomes superior in chemical resistance, abrasion resistance and durability.

It is optional to add a certain amount of a flow improving agent or a rheology control agent to the acrylic primer coating solution and the silicone hard coating solution so as to improve applicability thereof.

The transparent glass plate must have heat resistance against a temperature not lower than about 80° C. It may be an inorganic glass plate, or a resin glass plate such as polycarbonate (PC), polymethylmethacrylate (PMMA) or polyethylene terephthalate (PET). The shape and the size of the glass plate is not particularly limited. For example, the glass plate may be used as a curved glass plate, a tempered glass plate, a single glass plate, a multiple glass plate or a laminated glass plate.

According to the present invention, an infrared reflecting coating is optionally formed on a glass plate together with the above-mentioned ultraviolet absorbing multilayer coating. In this case, the infrared reflecting coating is interposed between the ultraviolet absorbing multilayer coating and the glass plate. Because of the provision of the ultraviolet absorbing multilayer coating on the infrared reflecting coating, the infrared reflecting coating is substantially improved in durability, and more particularly in humidity resistance, chemical resistance and abrasion resistance. Therefore, the ultraviolet absorbing and infrared reflecting coatings can be installed on a single glass plate as well as a multiple glass plate and a laminated glass plate. In contrast, a conventional ZnO film is not durable against acid solution. Therefore, it is not advisable to coat a single glass plate with the ZnO film.

As one example, the infrared reflecting coating comprises a layer of Ag or of an alloy of Ag, which is sandwiched between two layers of dielectric material. As compared with a tin oxide film formed by spraying method or CVD method, this coating is higher in the visible light transmittance and in reflectance of infrared rays ranging from near infrared region to far infrared region. As compared with a titanium nitride film, this coating is also higher in the visible light transmittance.

In the present invention, it is optional to have a layer of a metal which is interposed between the layer of Ag or an alloy of Ag and one layer of the dielectric material. The metal is one selected from the group consisting of Al, Zn, Ti, Ta, NiCr, Cr and Zr, an alloy containing at least one of these elements, and an nitride of one of these elements.

In the present invention, it is optional to use Au, Cu, Pt or an alloy containing at least one of these elements as the above-mentioned layer which is sandwiched between two layers of dielectric material, besides Ag and an alloy of Ag.

The above-mentioned dielectric material is an oxide of one selected from the group consisting of Si, Ti, Sn, Al, Cr, stainless steel, Ta, Zn, In, SiC and an alloy of at least one of these elements, an nitride of one selected from the group consisting of Si, Ti, Sn, Al, Cr, stainless steel, Ta, Zn, In, SiC and an alloy of at least one of these elements, or an oxynitride of one selected from the group consisting of Si, Ti, Sn, Al, Cr, stainless steel, Ta, Zn, In, SiC and an alloy of at least one of these elements.

As one example, it is preferable that the infrared reflecting coating comprises a first layer of a transparent dielectric material, which is formed on a transparent glass plate and has a refractive index of about 2.0 and a thickness of about 40 nm; a second layer of Ag or of an alloy containing Ag, which is formed on the first layer and has a thickness ranging from about 10 to about 15 nm; and a third layer of a transparent dielectric material, which is formed on the second layer and has refractive index of about 2.0 and a thickness of about 40 nm.

As another example, it is preferable that the infrared reflecting coating comprises a first layer of a transparent dielectric material, which is formed on a transparent glass plate and has a refractive index of about 2.0 and a thickness of about 40 nm; a second layer of Ag or of an alloy containing Ag, which is formed on the first layer and has a thickness ranging from about 10 to about 15 nm; a third layer of a transparent dielectric material, which is formed on the second layer and has a refractive index of about 2.0 and a thickness ranging from about 70 to about 80 nm; a fourth layer of Ag or of an alloy containing Ag, which is formed on the third layer and has a thickness ranging from about 10 to about 15 nm; and a fifth layer of a transparent dielectric material, which is formed on the fourth layer and has a refractive index of about 2.0 and a thickness of about 400 nm. The infrared reflecting coating is substantially high in the visible light transmittance because each layer of the coating has the above-mentioned thickness.

As still another example, the infrared reflecting coating comprises at least one layer of at least one selected from the group consisting of a metal, an oxide, a nitride, a carbide and an oxynitride.

It is preferable that the glass plate coated with the infrared reflecting coating and the ultraviolet absorbing coating is not lower than 65% in the visible light transmittance, not higher than 60% in transmittance for solar radiation, not higher than 0.15 in emissivity and not higher than 10% in transmittance for light having a wavelength of 370 nm. It is more preferable that the thus coated glass plate is not lower than 70% in the visible light transmittance, not higher than 55% in transmittance for solar radiation, not higher than 0.1 in emissivity and not higher than 5% in transmittance for light having a wavelength of 370 nm.

The following examples are illustrative of the present invention, but these examples are not limitative.

EXAMPLE 1

A glass plate was coated only with the ultraviolet absorbing multilayer coating.

The preparation of the ultraviolet absorbing acrylic primer coating solution (A) for the application to an inorganic glass plate will be explained in the following.

At first, a 1000 ml round bottom flask provided with an stirrer and a condenser was charged with 305 g of cyclohexanone and 221 g of propylene glycol monomethyl ether. Then, 32.5 g of "Acrylic BR-88 Resin" (trade name) made by Mitsubishi Rayon Co. was added to the mixture while the mixture was stirred at room temperature. Then, 3.25 g of the fluorescent brightening agent, "UVITEX-OB" (trade name) made by Ciba-Geigy Co., and 3.25 g of the ultraviolet absorbing agent, "TINUVIN 327" made by Ciba-Geigy Co., were added to the mixture while the mixture was stirred. The flask was put in an oil bath so as to raise the temperature of the mixture up to about 95° C. by spending about 30 min and then to maintain the temperature at about 95° C. for about 30 min. After the mixture was allowed to cool down to room temperature, 65 g of silicone-modified acrylic resin solution, "OS-808A" (trade name), was added to the mixture, and then the mixture was stirred to dissolve the same in the mixture. The thus obtained primer coating solution (A) was transparent, and had about 9 wt % of solid and a viscosity of about 250 cP (25° C.)

The preparation of the ultraviolet absorbing primer coating solution (B) for the application to a resin glass plate will be explained in the following.

At first, a 1000 ml round bottom flask provided with an stirrer and a condenser was charged with 58.5 g of cyclohexanone, 150 g of diacetone alcohol and 390 g of propylene glycol monomethyl ether. Then, 45.5 g of "Acrylic BR-85 Resin" (trade name) made by Mitsubishi Rayon Co. was added to the mixture while the mixture was stirred at room temperature. Then, 3.25 g of the fluorescent brightening agent, "UVITEX-OB" (trade name ) made by Ciba-Geigy Co., and 3.25 g of the ultraviolet absorbing agent, "TINUVIN327" made by Ciba-Geigy Co., were added to the mixture while the mixture was stirred. The flask was put in an oil bath so as to raise the temperature of the mixture up to about 95° C. by spending about 30 min and then to maintain the temperature at about 95° C. for about 30 min. The obtained primer coating solution (B) was transparent, and had about 8 wt % of solid and a viscosity of about 35 cP (25° C.).

The preparation of the silicone hard coating solution will be explained in the following.

A 500 ml round bottom flask provided with a stirrer and a condenser was charged with 100 g of methyltriethoxysilane and 10 g of 3-glycidoxypropyltrimethoxysilane. Then, 0.04 g of phthalic anhydride was added to the mixture. The flask was heated in water bath at a temperature of about 40° C. so as to dissolve phthalic anhydride in the mixture. Then, 100 g of weakly basic colloidal silica solution, "Snowtex C" (trade name) which is made by Nissan Chemical Co., and has an average particle size of about 15 µm and a content of $SiO_2$ of about 20%, was added to the mixture. The reaction was continued for about 5 days at a temperature of about 40° C., thereby obtaining a first composition having a number average molecular weight of about 1100 and a solid content of about 29%. The number average molecular weight was measured by gel permeation chromatography (GPC). Then, 145 g of isopropyl alcohol was added to the first composition. Then, this mixture was concentrated by the ultrafilter of nominal molecular weight limit of 1000, thereby obtaining a second composition having a number average molecular weight of about 1200 and a solid content of about 20%. About 0.1 parts by weight of dicyandiamide as a hardening catalyst was added to the second composition, thereby obtaining the silicone hard coating solution.

The application of the ultraviolet absorbing acrylic primer coating solution and the silicone hard coating solution will be explained in the following.

A clear float glass plate having widths of 300 mm and a thickness of about 3 mm was washed with a neutral detergent, rinsed with water and further with alcohol, dried and wiped with acetone. One surface of the glass plate was masked with film. Then, the glass plate was dipped in the ultraviolet absorbing acrylic primer coating solution (A) and then withdrawn at a speed of about 0.1 cm/sec. Then, the glass plate was dried at a temperature of about 120° C. for about 0.5 hr, thereby obtaining the glass plate with the ultraviolet absorbing film having a thickness of about 5 µm. Then, the glass plate was dipped in the silicone hard coating solution and then withdrawn at a speed of about 1 cm/sec. Then, the glass plate was dried at a temperature of about 120° C. for about 0.5 hr and then at a temperature of about 150° C. for about 0.5 hr, thereby obtaining the protective layer having a thickness of about 3 µm.

On the samples of the coated glass plate the transmittance for the ultraviolet rays and for the visible light was measured with a spectrophotometer. The result is shown in FIG. 1. As is shown in FIG. 1, the transmittance for the ultraviolet rays having wavelengths lower than about 400 nm (the upper limit wavelength of the ultraviolet rays) is not higher than 5%. That is, as compared with a conventional glass substrate and the after-mentioned Comparative Example 1, the ultraviolet rays is substantially cut by the ultraviolet absorbing multilayer coating according to Example 1 throughout its wavelength region. On the other hand, the transmittance for the visible light is sufficiently maintained throughout its wavelength region.

The coated glass plate was observed outdoors with the naked eye under the natural sunshine to check the fluorescence and cloud. With this, the coated glass plate had no fluorescence nor cloud.

The surface hardness of the ultraviolet absorbing multilayer coating was examined according to American Standard Testing Method ASTM D1044. The test was continued until 500 turns of abrading wheels of CS-10F type on the surface of the multilayer coating. After the test the haze value (ΔH, %) of each specimen was measured. The result of the haze value was 5% which indicates a superior abrasion resistance.

The adhesion strength was tested by the cross-cut adhesion test according to "JIS K 5400".

Chemical (acid) resistance was tested by dropping 25 wt % sulfuric acid to the samples. After 24 hr, the surface state of the samples was observed with the naked eye. Chemical (alkali) resistance was tested by dropping 5 wt % NaOH to the samples. After 4 hr, the surface state of the samples was observed with the naked eye. Chemical (solvent) resistance was tested by dropping 100% ethanol to the samples. After 4 hr, the surface state of the samples was observed by the naked eye. The results of the chemical resistance tests indicated no change in the surface state of the samples by observation with the naked eye.

Weatherability was tested with a sunshine carbon weathermeter in accordance with "JIS D 0205". The time until abnormality such as cracks, exfoliation and substantial yellowing is observed by the naked eye was measured. As the result, the abnormality was not observed even with over 1000 hr testing.

EXAMPLE 2

A method of preparing an ultraviolet absorbing multilayer coating in accordance with Example 1 was modified in respect of the silicone hard coating solution.

In place of a silicone hard coating solution according to Example 1, a commercial silicone hard coating solution called TOSGUARD 510 made by Toshiba Silicone Co. was used.

The glass plate coated with the ultraviolet absorbing film according to Example 1 was dipped in the silicone hard coating solution, and then withdrawn at a speed of about 1 cm/sec. Then, the glass plate was dried at a temperature of about 120° C. for about 3 hr, thereby obtaining a protective film having a thickness of about 3 µm. The same evaluation tests as those of Example 1 were conducted. Similar to Example 1, the results of the tests were satisfactory.

EXAMPLE 3

A PET film having a thickness of about 50 µm was dipped in the ultraviolet absorbing acrylic primer coating solution (B) and then withdrawn at a speed of about 0.1 cm/sec. Then, the PET film was dried at a temperature of about 120° C. for about 0.5 hr, thereby obtaining an ultraviolet absorbing film having a thickness of about 5 µm. Then, the PET film was dipped in the silicone hard coating solution according to Example 1, and then withdrawn at a speed of about 1 cm/sec. Then, the PET film was dried at a temperature of about 120° C. for about 0.5 hr and then at a temperature of about 150° C. for about 0.5 hr, thereby obtaining a protective film having a thickness of about 3 µm. The same evaluation tests as those of Example 1 were conducted. Similar to Example 1, the results of the tests were satisfactory.

COMPARATIVE EXAMPLE 1

Example 1 was repeated except that the fluorescent brightening agent (UVITEX-OB) was omitted in the preparation of the primer coating solution. The obtained coated glass plate was colorless and transparent when viewed from both the coated side and the uncoated side. However, as is shown in FIG. 1, the coated glass plate could not cut ultraviolet rays having a wavelength of about 400 nm.

COMPARATIVE EXAMPLE 2

Example 1 was repeated except that the ultraviolet absorbing agent (TINUVIN 327) was omitted in the preparation of the primer coating solution. The obtained coated glass plate was colorless and had bluish fluorescence indoors, and had blue-white colored cloud outdoors under the sunshine. Furthermore, the coated glass plate was unsatisfactory in cutting ultraviolet rays having a wavelength of about 400 nm.

COMPARATIVE EXAMPLE 3

Example 1 was repeated except that the silicone-modified acrylic resin (OS-808A) was omitted in the preparation of the primer coating solution. The obtained glass plate was colorless and transparent when viewed from both the coated side and the uncoated side.

Water resistance was tested by immersing the samples in hot water. After the test, adhesion of the multilayer coating was impaired.

EXAMPLE 4

A glass plate was coated with the infrared reflecting coating and the ultraviolet absorbing multilayer coating.

The preparation of the ultraviolet absorbing acrylic primer coating solution will be explained in the following.

At first, a 1000 ml round bottom flask provided with an stirrer and a condenser was charged with 350 g of cyclohexanone and 495 g of propylene glycol monomethyl ether. Then, 55 g of Acrylic BR-85 Resin (trade name) made by Mitsubishi Rayon Co. was added to the mixture while the mixture was stirred at room temperature. Then, 2 g of the fluorescent brightening agent, UVITEX-OB (trade name ) made by Ciba-Geigy Co., and 9 g of the ultraviolet absorbing agent, TINUVIN327 made by Ciba-Geigy Co., were added to the mixture while the mixture was stirred. The flask was put in an oil bath so as to raise the temperature of the mixture up to about 95° C. by spending about 30 min and then to maintain the temperature at about 95° C. for about 30 min. After the mixture was allowed to cool down to room temperature, about 100 g of silicone-modified acrylic resin, OS-808A (trade name), was added to the mixture, and then the mixture was stirred to dissolve the same in the mixture. The obtained primer coating solution was transparent, and had about 9 wt % of solid and a viscosity of about 600 cP.

The silicone hard coating solution was prepared in accordance with the process of Example 1. With this, the first composition having a number average molecular weight of about 1100 and a solid content of about 30% was obtained, and then the second composition having a number average molecular weight of about 1200 and a solid content of about 22% was obtained.

Formation of an infrared reflecting coating on a glass plate will be described in the following.

At first, a float glass plate (FL3) having widths of 300 mm and a thickness of about 3 mm was washed with a neutral detergent, rinsed with water and further with isopropyl alcohol and dried. Then, the glass plate was set horizontally on a carrier which was horizontally movably installed in a vacuum chamber of a DC magnetron sputtering apparatus. The carrier was reciprocatively movable so as to be positioned alternately above a Zn target and an Ag target. Initially the chamber was depressurized to the extent not higher than about $5\times10^{-6}$ Torr. Then, a mixed gas of Ar and $O_2$ was introduced into the chamber to maintain the degree of vacuum at about $2\times10^{-3}$ Torr. Flow rate ratio of $O_2$ to Ar was adjusted to 100:0 to 50:50. Under such condition, the Zn target was sputtered at a power of about 1.0 kW while the glass plate was horizontally transferred in a region above the Zn target at a constant speed of about 250 mm/min. As the result, a ZnOx film having a thickness of about 40 nm deposited on the glass plate as a first layer. Then, the feed of the gas and the power supply to the Zn target were stopped, and then about 45 cc of Ar gas was introduced into the chamber to maintain the degree of vacuum at about $3\times10^{-3}$ Torr. Under such condition, the glass plate was transferred to a region above the Ag target, and the Ag target was sputtered at a power of about 0.1 kW while the glass plate was horizontally transferred at a constant speed of about 800 mm/min. As the result, an Ag film having a thickness of about 10 nm deposited, as the second layer, on the first layer. Then, the feed of gas and the power supply to the Ag target were stopped, and then Ar gas was introduced into the chamber to maintain the degree of vacuum at about $3\times10^{-3}$ Torr. Under such condition, the glass plate was transferred back to the region above the Zn target, and the Zn target was sputtered at a power of about 0.1 kW while the glass plate was horizontally transferred at a constant speed of about 1600 mm/min. As the result, a Zn film having a thickness of about 6 nm deposited, as the third layer, on the second layer. Then, the feed of gas and the power supply to the Zn target were stopped, and then Ar gas and $O_2$ gas were introduced into the vacuum chamber to have a flow rate ratio of $O_2$ gas to Ar gas in a range from 100:0 to 50:50 and to maintain the degree of vacuum at about $2\times10^{-3}$ Torr. Under such condition, the Zn target was sputtered at a power of about 1.0 kW while the glass plate was horizontally transferred in the region above the Zn target at a speed of about 250 mm/min. As the result, a ZnOx film having a thickness of about 40 nm deposited, as the fourth layer, on the third layer. Thus, the infrared reflecting multilayer coating was formed on the glass plate (see Table 1). Then, the feed of gas and the power supply to the Zn target were stopped.

The glass plate coated with the infrared reflecting coating was taken out from the vacuum chamber. Then, the uncoated surface of the glass plate was masked with a film. Then, the glass plate was dipped in the above-mentioned primer coating solution, and then withdrawn at a speed of about 0.15 cm/sec. Then, the glass plate was dried at a temperature of about 120° C. for about 30 min, thereby obtaining an ultraviolet absorbing film having a thickness of about 8 μm. Then, the glass plate was dipped in the above-mentioned silicone hard coating solution, and then withdrawn at a speed of about 1 cm/sec. Then, the glass plate was dried at a temperature of about 120° C. for about 30 min and then at a temperature of about 140° C. for about 30 min, thereby obtaining a protective film having a thickness of about 5 μm.

On the samples of the coated glass plate, the transmittance and reflectance for the visible light (380–780 nm), the transmittance and reflectance for solar radiation (340–1800 nm) and transmittance for ultraviolet rays having wavelengths of 360, 370 and 380 nm were measured with an automated recording spectrophotometer (Type 340 of Hitachi Ltd.) and a $D_{65}$ light source by the methods according to "JIS Z 8722" and "JIS R 3106". The results are shown in Table 2.

Wear resistance of the coating was examined by the traverse test. In the test, 6 pieces of broad cloth #40 were sandwiched between the multilayer coating and a base (diameter: 5 cm) of a cylinder. A load of 0.1 kg/cm² was applied to the cylinder. The test was continued until 5000 turns of the cylinder with a stroke of 150 mm. After that, the surface condition of the coating was observed by the naked eye. In Table 3, with respect to wear resistance, "A" means that no deterioration of the multilayer coating was observed, and "B" means that deterioration of the same was observed.

Acid and alkali resistances of the multilayer coating were examined by immersing some specimens of the coated glass plate in 1N HCl solution at room temperature for about 6 hr and separate specimens in 1N NaOH solution at room temperature for about 6 hr. In both cases the degree of deterioration of the coating was examined by visual observation according to JIS R 3221. In Table 3, with respect to acid and alkali resistances, "A" means that deterioration of the coating was not perceptible, and "B" means that it was perceptible.

Humidity resistance of the coating was examined by putting specimens of the coated glass in a chamber having a temperature of 50° C. and a humidity of 90% for 1, 2, 5, 10, 20 and 30 days. The degree of deterioration of the coating was examined by visual observation. In Table 3, with respect to humidity resistance, "A" means that fault such as spots was not perceptible, and "B" means that some fault was perceptible.

EXAMPLES 5 AND 6

By a process which is similar to Example 4, the infrared reflecting multilayer coating which is shown in Table 1 and the ultraviolet absorbing multilayer coating according to Example 4 were formed on a glass plate in each of Examples 5 and 6.

In Example 5, the film of an alloy of Ag and Cu was formed by the DC magnetron sputtering with the feed of Ar gas, and the ITO film was formed by the DC reactive magnetron sputtering with a ITO target and the feed of Ar and a very small amount of $O_2$.

The same evaluation tests as those of Example 4 were conducted. The results are shown in Tables 2 and 3.

COMPARATIVE EXAMPLE 4

The infrared reflecting coating of Example 4 was formed on glass plate in the same manner as that of Example 4. However, an ultraviolet absorbing multilayer coating was omitted.

The same evaluation test as those of Example 4 were conducted. The results are shown in Tables 2 and 3.

COMPARATIVE EXAMPLE 5

An ultraviolet absorbing multilayer coating was omitted. An infrared reflecting coating consisting of a ZnOx film (first layer), a SiOx film (second layer), a TiOx film (third layer) and a SiOx film (fourth layer) was formed on a glass plate by the sputtering method. The SiOx film was formed by the RF magnetron sputtering with a SiO target and the feed of Ar and $O_2$. The TiOx film was formed by the DC magnetron sputtering with a Ti target and the feed of $O_2$.

The same evaluation test as those of Example 4 were conducted. The results are shown in Tables 2 and 3.

COMPARATIVE EXAMPLE 6

An ultraviolet absorbing multilayer coating was omitted. An infrared reflecting coating consisting of a ZnOx film (first layer), an Ag film (second layer), a Zn film (third layer), a TiOx film (fourth layer) and SiOx layer (fifth layer) was formed on a glass plate by the sputtering method.

The same evaluation test as those of Example 4 were conducted. The results are shown in Tables 2 and 3.

COMPARATIVE EXAMPLE 7

An infrared reflecting multilayer coating was omitted. An ultraviolet absorbing multilayer coating consisting of an ultraviolet absorbing film having a thickness of about 8 μm and a protective film having a thickness of about 4 μm was directly formed on a glass plate (FL 3) in the same manner as that of Example 4.

The same evaluation test as those of Example 4 were conducted. The results are shown in Tables 2 and 3.

TABLE 1

| | Glass Plate | Structure of Infrared Reflecting Multilayer Coating (thickness, nm) | | | | | | |
|---|---|---|---|---|---|---|---|---|
| | | 1st layer | 2nd layer | 3rd layer | 4th layer | 5th layer | 6th layer | 7th layer |
| Ex. 4 | FL 3 | ZnOx (40) | Ag (10) | Zn (6) | ZnOx (40) | | | |
| Ex. 5 | FL 3 | ITO (45) | AgCu (12) | Zn (3) | ZnOx (45) | | | |
| Ex. 6 | FL 3 | ZnOx (40) | Ag (5) | Zn (2) | ZnOx (70) | Ag (5) | Zn (2) | ZnOx (35) |
| Com. Ex. 4 | FL 3 | ZnOx (40) | Ag (10) | Zn (6) | ZnOx (40) | | | |
| Com. Ex. 5 | NFL 3.5 | ZnOx (500) | SiOx (160) | TiOx (100) | SiOx (60) | | | |
| Com. Ex. 6 | NFL 3.5 | ZnOx (500) | Ag (3) | Zn (3) | TiOx (140) | SiOx (50) | | |

TABLE 2

| | Visible Light Transmittance (%) | Visible Light Reflectance (%) | | Solar Radiation Transmittance (%) | Solar Radiation Reflectance (%) | | Ultraviolet Transmittance (%) | | |
|---|---|---|---|---|---|---|---|---|---|
| | | uncoated side | coated side | | uncoated side | coated side | 360 nm | 370 nm | 380 nm |
| Ex. 4 | 70.6 | 10.0 | 8.3 | 50.4 | 21.2 | 22.4 | 0 | 0 | 0.1 |
| Ex. 5 | 65.8 | 17.5 | 22.5 | 45.6 | 30.9 | 38.5 | 0 | 0 | 0 |
| Ex. 6 | 71.0 | 9.8 | 8.5 | 47.6 | 25.3 | 23.9 | 0 | 0 | 0.1 |
| Com. Ex. 4 | 71.0 | 5.5 | 6.9 | 50.9 | 19.0 | 24.6 | 36.1 | 53.0 | 64.8 |
| Com. Ex. 5 | 74.0 | 10.2 | 10.5 | 55.9 | 25.3 | 17.6 | 0.7 | 5.7 | 24.3 |
| Com. Ex. 6 | 60.8 | 12.3 | 14.6 | 46.9 | 17.2 | 15.4 | 0.2 | 1.7 | 12.2 |
| Com. Ex. 7 | 89.5 | 7.2 | 7.2 | 83.0 | 6.7 | 6.8 | 0 | 0.1 | 0.2 |

TABLE 3

| | Humidity Resistance | | | | | | Wear Resistance | Acid Resistance | Alkali Resistance |
|---|---|---|---|---|---|---|---|---|---|
| | 1 day | 2 days | 5 days | 10 days | 20 days | 30 days | | | |
| Ex. 4 | A | A | A | A | A | A | A | A | A |
| EX. 5 | A | A | A | A | A | A | A | A | A |
| EX. 6 | A | A | A | A | A | A | A | A | A |
| Com. Ex. 4 | B | B | B | B | B | B | B | B | B |
| Com. Ex. 5 | A | A | A | A | A | A | A | B | B |
| Com. Ex. 6 | B | B | B | B | B | B | B | B | B |
| Com. Ex. 7 | A | A | A | A | A | A | A | A | A |

EXAMPLE 7

A glass plate was coated with the infrared reflecting coating and the ultraviolet absorbing multilayer coating.

The preparation of the ultraviolet absorbing acrylic primer coating solution will be explained in the following.

At first, a 1000 ml round bottom flask provided with an stirrer and a condenser was charged with 350 g of cyclohexanone and 493 g of propylene glycol monomethyl ether. Then, 52 g of Acrylic BR-88 Resin (trade name) made by Mitsubishi Rayon Co. was added to the mixture while the mixture was stirred at room temperature. Then, 2 g of the fluorescent brightening agent, UVITEX-OB (trade name ) made by Ciba-Geigy Co., and 8 g of the ultraviolet absorbing agent, TINUVIN327 made by Ciba-Geigy Co., were added to the mixture while the mixture was stirred. The flask was put in an oil bath so as to raise the temperature of the mixture up to about 95° C. by spending about 30 min and then to maintain the temperature at about 95° C. for about 30 min. After the mixture was allowed to cool down to room temperature, about 95 g of silicone-modified acrylic resin solution, OS-808A (trade name), was added to the mixture, and then the mixture was stirred to dissolve the same in the mixture. The thus obtained primer coating solution was transparent, and had about 8.5 wt % of solid and a viscosity of about 550 cP.

The silicone hard coating solution was prepared in accordance with the process of Example 1. Therefore, the solution had the same properties as those of Example 1 with respect to the number average molecular weight and the solid content.

Formation of an infrared reflecting coating on a glass plate will be described in the following.

At first, a clear float glass plate having widths of 300 mm and a thickness of about 3 mm was washed with a neutral detergent, rinsed with water and further with isopropyl alcohol and dried. Then, the glass plate was set horizontally on a carrier which was horizontally movably installed in a vacuum chamber of a DC magnetron sputtering apparatus. The carrier was reciprocatively movable so as to be positioned above a Ti target. Initially the chamber was depressurized to the extent not higher than about $5 \times 10^{-6}$ Torr. Then, a mixed gas of Ar and $N_2$ was introduced into the chamber to maintain the degree of vacuum at about $2 \times 10^{-3}$ Torr. Flow rate ratio of Ar to $N_2$ was adjusted to 0:100 to 50:50. Under such condition, the Ti target was sputtered at a power of about 1.0 kW while the glass plate was horizontally transferred in a region above the Ti target at a constant speed of about 85 mm/min. As the result, a TiNx film having a thickness of about 35 nm deposited on the glass plate as an infrared reflecting coating. Then, the feed of the gas and the power supply to the Ti target were stopped. The glass plate which has been thus coated with the infrared reflecting coating was taken out from the vacuum chamber. Then, the uncoated surface of the glass plate was masked with a film. Then, the glass plate was dipped in the above-mentioned primer coating solution, and then withdrawn at a speed of about 0.1 cm/sec. Then, the glass plate was dried at a temperature of about 120° C. for about 0.5 hr, thereby obtaining an ultraviolet absorbing film having a thickness of about 7 μm. Then, the glass plate was dipped in the above-mentioned silicone hard coating solution, and then withdrawn at a speed of about 1 cm/sec. Then, the glass plate was dried at a temperature of about 120° C. for about 0.5 hr and then at a temperature of about 150° C. for about 0.5 hr, thereby obtaining a protective film having a thickness of about 4 μm.

Figure 3:
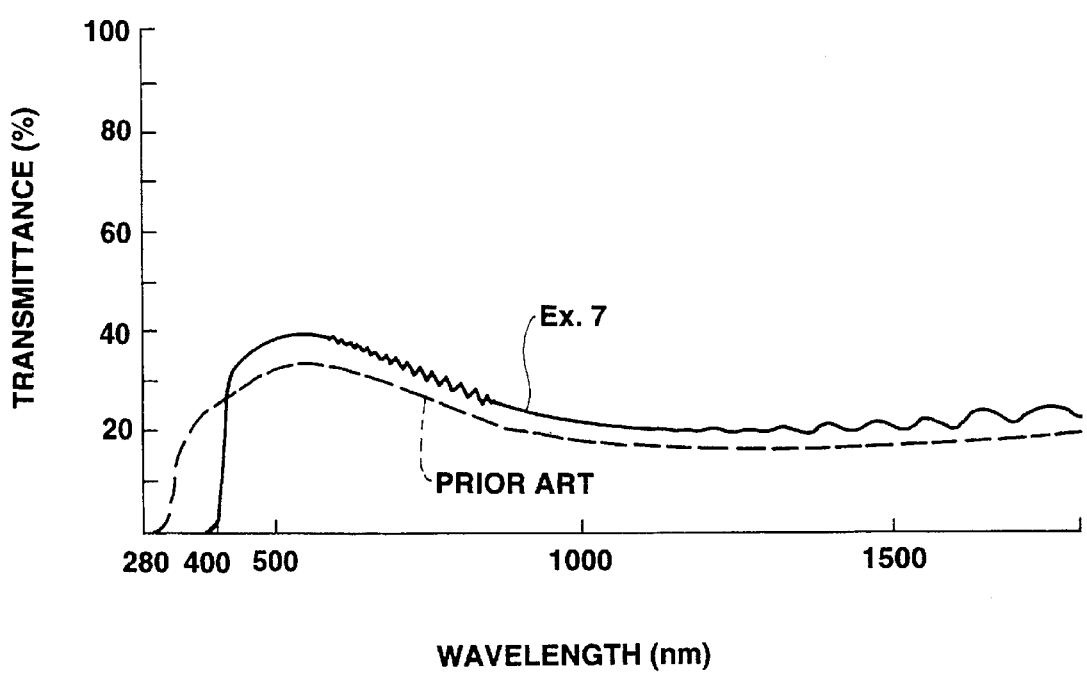
FIG. 3 is a view similar to FIG. 1, but with respect to a coated glass plate according to Example 7 and a glass plate having a conventional infrared reflecting film formed thereon.

On the samples of the coated glass plate, the transmittance for the ultraviolet rays, the visible light and the infrared rays was measured with a spectrophotometer. The result is shown in FIG. 3. As is shown in FIG. 3, as compared with a prior art (a glass plate coated with only a conventional infrared reflecting coating), the ultraviolet rays was substantially cut by the ultraviolet absorbing multilayer coating according to Example 7 throughout its wavelengths. On the other hand, the transmittance for the visible light of Example 7 was higher than that of the prior art by about 5%.

The surface hardness, the adhesion strength, the chemical resistance against acid, alkali and solvent, and weatherability were tested in the same manner as that of Example 1. The result of the haze value in the test of surface hardness was about 5% which indicates a superior abrasion resistance. The results of the chemical resistance test indicated no change in the surface state of the samples by observation with the naked eye. As the result of the weatherability test, the abnormality was not observed even with over 1000 hr testing.

Besides, wear resistance of the multilayer coating was examined by the traverse test. The test was continued until 1000 turns at a rate of 30 turns/min with a load of 100 g/cm². After that, the surface condition of the multilayer coating was observed by the naked eye. As the result, no deterioration was observed.

EXAMPLE 8

A glass plate was coated with the infrared reflecting coating and the ultraviolet absorbing multilayer coating.

Formation of the infrared reflecting coating on a glass plate will be described in the following.

At first, a clear float glass plate which has the same size as that of Example 7 was set horizontally on a carrier which was horizontally movably installed in a vacuum chamber of a DC magnetron sputtering apparatus. The carrier was reciprocatively movable so as to be positioned alternately above a Zn target and a stainless steel (SUS) target. Initially the chamber was depressurized to the extent not higher than about $5\times10^{-6}$ Torr. Then, a mixed gas of Ar and $O_2$ was introduced into the chamber to maintain the degree of vacuum at about $2\times10^{-3}$ Torr. Flow rate ratio of Ar to $O_2$ was adjusted to 0:100 to 50:50. Under such condition, the Zn target was sputtered at a power of about 1.0 kW while the glass plate was horizontally transferred in a region above the Zn target at a constant speed of about 1300 mm/min. As the result, a ZnOx film having a thickness of about 10 nm deposited on the glass plate as a first layer. Then, the feed of the gas and the power supply to the Zn target were stopped, and then Ar gas was introduced into the chamber to maintain the degree of vacuum at about $2\times10^{-3}$ Torr. Under such condition, the glass plate was transferred to a region above the SUS target, and the SUS target was sputtered at a power of about 0.15 kW while the glass plate was horizontally transferred at a constant speed of about 2000 mm/min. As the result, a SUS film having a thickness of about 3.5 nm deposited, as the second layer, on the first layer. Then, the feed of gas and the power supply to the SUS target were stopped, and then Ar gas and $O_2$ gas were introduced into the vacuum chamber to have a flow rate ratio of $O_2$ gas to Ar gas in a range from 100:0 to 50:50 and to maintain the degree of vacuum at about $2\times10^{-3}$ Torr. Under such condition, the Zn target was sputtered at a power of about 1.0 kW while the glass plate was horizontally transferred in the region above the Zn target at a speed of about 1300 mm/min. As the result, a ZnOx film having a thickness of about 10 nm deposited, as the third layer, on the second layer. Thus, the infrared reflecting coating consisting of the first, second and third layers was formed on the glass plate. Then, the feed of gas and the power supply to the Zn target were stopped.

Then, the glass plate was coated with the ultraviolet absorbing primer coating solution according to Example 7 in the same manner as that of Example 7 so as to form an ultraviolet absorbing film having a thickness of about 6 μm. Then, the glass plate was coated with the silicone hard coating solution according to Example 1 in the same manner as that of Example 1 so as to form a protective film having a thickness of about 3 μm.

The same evaluation tests as those of Example 7 were conducted. The results of the test of the transmittance for the ultraviolet rays and the visible light show that the ultraviolet rays was substantially cut by the ultraviolet absorbing multilayer coating throughout its wavelength region, and that the transmittance for the visible light of Example 8 was higher than that of the prior art by about 5%. The result of the haze value in the test of surface hardness was about 6% which indicates a superior abrasion resistance. The results of the chemical resistance test indicated no change in the surface state of the samples by observation with the naked eye. As the result of weatherability test, the abnormality was not observed even with over 1000 hr testing. As the result of the traverse test, no deterioration was observed.

What is claimed is:

1. An ultraviolet absorbing colorless and transparent multilayer coating formed on one side of a transparent substrate, said multilayer coating comprising:
    a first layer formed on a surface of the transparent substrate having a heat resistance against a temperature not lower than 80° C., said first layer being an ultraviolet absorbing film prepared by hardening a primer coating solution of a synthetic resin which is mixed with a fluorescent brightening agent and an ultraviolet absorbing agent, wherein the molar ratio of brightening agent to ultraviolet absorbing agent is 1:8 to 1:1, wherein the concentration of the synthetic resin in the primer coating solution is from about 1 to about 15 wt %, wherein the concentration of a total of the fluorescent brightening agent and the ultraviolet absorbing agent in the primer coating solution is from about 0.5 to about 3 wt %, and wherein viscosity of the primer coating solution is from about 10 to about 1000 cP; and a second layer formed on said first layer, said second layer being a film of a siloxane polymer.

2. A multilayer coating according to claim 1, wherein said synthetic resin is selected from the group consisting of an acrylic resin, an urethane resin, a fluororesin and a polyester resin.

3. A multilayer coating according to claim 2, wherein said synthetic resin is said acrylic resin.

4. A multilayer coating according to claim 1, wherein said ultraviolet absorbing agent is one selected from the group consisting of benzophenone, benzotriazole, cyanoacrylate and salicylate.

5. A multilayer coating according to claim 1, wherein said synthetic resin is further mixed with an agent for improving adherence of said first layer to said transparent substrate.

6. A multilayer coating according to claim 5, wherein said agent for improving adherence of said first layer to said transparent substrate is a silicone-modified acrylic resin solution.

7. A multilayer coating according to claim 1, wherein said transparent substrate is one selected from the group consisting of an inorganic glass and a resin glass.

8. A multilayer coating according to claim 1, further comprising an infrared reflecting coating which is sandwiched between the transparent substrate and said first layer.

9. A multilayer coating according to claim 8, wherein said infrared reflecting coating comprises a third layer of one selected from the group consisting of Ag, Au, Cu, Pt and an alloy of at least one of Ag, Au, Cu and Pt.

10. A multilayer coating according to claim 9, wherein said infrared reflecting coating further comprises a fourth layer of a dielectric material, a fifth layer of a metal and a sixth layer of a dielectric material, said fourth layer being formed on the transparent substrate, said third layer being formed on said forth layer, said fifth layer being formed on said third layer, said sixth layer being formed on said fifth layer.

11. A multilayer coating according to claim 10, wherein each of said dielectric materials is an oxide of one selected from the group consisting of Si, Ti, Sn, Al, Cr, stainless steel, Ta, Zn, In, SiC and an alloy of at least one of Si, Ti, Sn, Al, Cr, stainless steel, Ta, Zn, In and SiC.

12. A multilayer coating according to claim 10, wherein said dielectric material is an nitride of one selected from the group consisting of Si, Ti, Sn, Al, Cr, stainless steel, Ta, Zn, In, SiC and an alloy of at least one of Si, Ti, Sn, Al, Cr, stainless steel, Ta, Zn, In and SiC.

13. A multilayer coating according to claim 10, wherein said dielectric material is an oxynitride oxide of one selected from the group consisting of Si, Ti, Sn, Al, Cr, stainless steel, Ta, Zn, In, SiC and an alloy of at least one of Si, Ti, Sn, Al, Cr, stainless steel, Ta, Zn, In and SiC.

14. A multilayer coating according to claim 8, wherein said infrared reflecting coating comprises at least one layer of at least one selected from the group consisting of a metal, an oxide, a nitride, a carbide and an oxynitride.

15. A colorless and transparent multilayer coating formed on one side of a transparent substrate, said multilayer coating comprising:
an infrared reflecting coating formed on a surface of the transparent substrate having a heat resistance against a temperature not lower than 80° C., said infrared reflecting coating comprising at least one layer of one selected from the group consisting of Ag, Au, Cu, Pt and an alloy of at least one of Ag, Au, Cu and Pt;

a first layer formed on said infrared reflecting coating, said first layer being an ultraviolet absorbing film prepared by hardening a primer coating solution of a synthetic resin which is mixed with a fluorescent brightening agent and an ultraviolet absorbing agent, wherein the molar ratio of brightening agent to ultraviolet absorbing agent is 1:8 to 1:1, wherein the concentration of the synthetic resin in the primer coating solution is from about 1 to about 15 wt %, wherein the concentration of a total of the fluorescent brightening agent and the ultraviolet absorbing agent in the primer coating solution is from about 0.5 to about 3 wt %, and wherein viscosity of the primer coating solution is from about 10 to about 1000 cP; and a second layer formed on said first layer, said second layer being a film of a siloxane polymer.

16. A colorless and transparent multilayer coating formed on one side of a transparent substrate, said multilayer coating comprising:

an infrared reflecting coating formed on a surface of the transparent substrate having a heat resistance against a temperature not lower than 80° C., said infrared reflecting coating comprising at lest one layer of at least one selected from the group consisting of a metal, an oxide, a nitride, a carbide and an oxynitride;

a first layer formed on said infrared reflecting coating, said first layer being an ultraviolet absorbing film prepared by hardening a primer coating solution of a synthetic resin which is mixed with a fluorescent brightening agent and an ultraviolet absorbing agent, wherein the molar ratio of brightening agent to ultraviolet absorbing agent is 1:8 to 1:1, wherein the concentration of the synthetic resin in the primer coating solution is from about 1 to about 15 wt %, wherein the concentration of a total of the fluorescent brightening agent and the ultraviolet absorbing agent in the primer coating solution is from about 0.5 to about 3 wt %, and wherein viscosity of the primer coating solution is from about 10 to about 1000 cP; and a second layer formed on said first layer, said second layer being a film of a siloxane polymer.

17. A multilayer coating according to claim 1, wherein said second layer has a thickness ranging from about 2 μm to about 5 μm.

18. A multilayer coating according to claim 8, wherein said infrared reflecting coating comprises at least one layer of at least one member selected from the group consisting of a metal, an oxide and a nitride.

19. A multilayer coating according to claim 18, wherein said infrared reflecting coating comprises at least one layer of at least one member selected from the group consisting of $TiN_x$, $ZnO_x$ and a stainless steel.

20. A multilayer coating according to claim 16, wherein said infrared reflecting coating comprises at least one layer of at least one member selected from the group consisting of a metal, an oxide, and a nitride.

21. A multilayer coating according to claim 20, wherein said infrared reflecting coating comprises at least one layer of at least one member selected from the group consisting of $TiN_x$, $ZnO_x$ and a stainless steel.

\* \* \* \* \*